(12) United States Patent
Helm

(10) Patent No.: US 9,984,514 B2
(45) Date of Patent: May 29, 2018

(54) VEHICLE FLUID REPLACEMENT MONITORING SYSTEM AND METHOD

(71) Applicant: Toyota Motor Engineering & Manufacturing North America, Inc., Erlanger, KY (US)

(72) Inventor: Sean L. Helm, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days. days.

(21) Appl. No.: 15/010,425

(22) Filed: Jan. 29, 2016

(65) Prior Publication Data

US 2017/0221284 A1    Aug. 3, 2017

(51) Int. Cl.
| | |
|---|---|
| *G07C 5/08* | (2006.01) |
| *G07C 5/00* | (2006.01) |
| *G05B 23/02* | (2006.01) |
| *B60R 16/023* | (2006.01) |
| *G05D 1/00* | (2006.01) |

(52) U.S. Cl.
CPC ........ *G07C 5/0808* (2013.01); *B60R 16/0234* (2013.01); *G05B 23/0283* (2013.01); *G05D 1/0016* (2013.01); *G07C 5/006* (2013.01); *G07C 5/008* (2013.01); *G07C 5/085* (2013.01)

(58) Field of Classification Search
CPC ...... G07C 5/0808; G07C 5/008; G07C 5/006; G07C 5/085; G05B 23/0283; B60R 16/0234; G05D 1/0016
See application file for complete search history.

(56) References Cited

U.S. PATENT DOCUMENTS

| | | | | |
|---|---|---|---|---|
| 5,522,474 | A * | 6/1996 | Burman | ............. F01M 11/0458 |
| | | | | 141/98 |
| 5,844,473 | A | 12/1998 | Kaman | |
| 6,977,583 | B2 * | 12/2005 | Gornick | ................. F01M 11/10 |
| | | | | 123/196 S |
| 7,004,206 | B2 * | 2/2006 | Viken | ................ F01M 11/0458 |
| | | | | 141/1 |
| 7,177,738 | B2 | 2/2007 | Diaz | |

(Continued)

FOREIGN PATENT DOCUMENTS

| | | |
|---|---|---|
| CN | 201463988 U | 5/2010 |
| CN | 202994250 U | 6/2013 |

*Primary Examiner* — Russell Frejd
(74) *Attorney, Agent, or Firm* — Christopher G. Darrow; Darrow Mustafa PC

(57) ABSTRACT

A computing device for a vehicle fluid replacement monitoring system is provided. The computing device includes one or more processors for controlling operation of the computing device, and a memory for storing data and program instructions usable by the one or more processors. The one or more processors are configured to execute instructions stored in the memory to receive an indication of a "fluid-empty" condition in a fluid reservoir; receive an indication of a "fluid-present" condition occurring in the fluid reservoir after the "fluid-empty" condition; acquire, responsive to receiving the indication of the "fluid-present" condition, information relating to the "fluid-present" condition; and store, in a memory, the information relating to the "fluid-present" condition.

14 Claims, 3 Drawing Sheets

(56) References Cited

U.S. PATENT DOCUMENTS

| | | | |
|---|---|---|---|
| 8,126,607 B2* | 2/2012 | Boss | G01M 17/007 |
| | | | 701/29.4 |
| 2005/0199312 A1* | 9/2005 | Wiens | G07F 13/025 |
| | | | 141/94 |
| 2006/0038130 A1* | 2/2006 | P. Boyle | G01N 21/3151 |
| | | | 250/339.11 |
| 2016/0023640 A1* | 1/2016 | Casale | B67D 7/145 |
| | | | 141/94 |
| 2016/0042576 A1* | 2/2016 | Fischer | G07C 5/008 |
| | | | 701/29.4 |

* cited by examiner

VEHICLE FLUID REPLACEMENT MONITORING SYSTEM AND METHOD

TECHNICAL FIELD

Aspects of the disclosure generally relate to systems and methods for monitoring vehicle maintenance and, more particularly, to systems and methods for monitoring fluid changes in vehicles.

BACKGROUND

To help maintain a vehicle in peak operating condition, vehicle maintenance should be performed as recommended. An important part of vehicle maintenance is the flushing and replacement of various vehicle operating fluids, such as engine coolant, engine oil, transmission fluid, brake fluid, etc. Often fluid changes are not performed by a licensed dealership, but rather by a garage or fluid-maintenance chain (such as an oil-change chain). Some vehicle owners also perform their own fluid changes, and do not keep reliable records of the changes. In addition, the fluid changes may not be performed according to the recommended schedule. Thus, due to the inconsistency with which many fluid changes are performed, reliable records documenting fluid changes over the life of the vehicle may not exist. Thus, it would be beneficial to have a system which records various vehicle fluid changes and maintains a reliable record of the fluid changes for the life of the vehicle.

SUMMARY OF THE INVENTION

In one aspect of the embodiments described herein, a computing device for a vehicle fluid replacement monitoring system is provided. The computing device includes one or more processors for controlling operation of the computing device, and a memory for storing data and program instructions usable by the one or more processors. The one or more processors are configured to execute instructions stored in the memory to receive an indication of a "fluid-empty" condition in a fluid reservoir; receive an indication of a "fluid-present" condition occurring in the fluid reservoir after the "fluid-empty" condition; acquire, responsive to receiving the indication of the "fluid-present" condition, information relating to the "fluid-present" condition; and store, in a memory, the information relating to the "fluid-present" condition.

In another aspect of the embodiments described herein, a method of monitoring vehicle fluid changes is provided. The method includes steps of detecting, in a vehicle fluid reservoir, a "fluid-empty" condition; detecting, in the fluid reservoir, a "fluid-present" condition occurring after the "fluid-empty" condition; acquiring, after detection of the "fluid-present" condition, information relating to the detected "fluid-present" condition; and storing, in a memory, the information relating to the detected "fluid-present" condition.

DETAILED DESCRIPTION

The present disclosure describes embodiments of a vehicle fluid replacement monitoring system. The system is configured to detect a "fluid-empty" condition in a fluid reservoir indicative of a fluid flush or draining of the reservoir. The system is also configured to detect a "fluid-present" condition in the fluid reservoir following the "fluid-present" condition. The "fluid-present" condition is indicative of the reservoir being filled after draining, thereby signifying completion of the fluid change. When the "fluid-present" condition is detected, the system acquires information relating to the condition. This information may include information indicative of a location of the vehicle when the indication of the "fluid-present" condition was received, information indicative of a type of fluid entering the reservoir (i.e., the type of fluid change, for example, engine oil) and information indicative of a total mileage traveled by the vehicle as of when the indication of the "fluid-present" condition was received. The system thus effects an automatic recordation of the fluid change and the values of pertinent parameters relating to the fluid change. The system also maintains a running total of all fluid changes performed each fluid reservoir. This provides an accurate and secure record of all vehicle fluid changes, which aids in determining if recommended maintenance has been performed on the vehicle.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
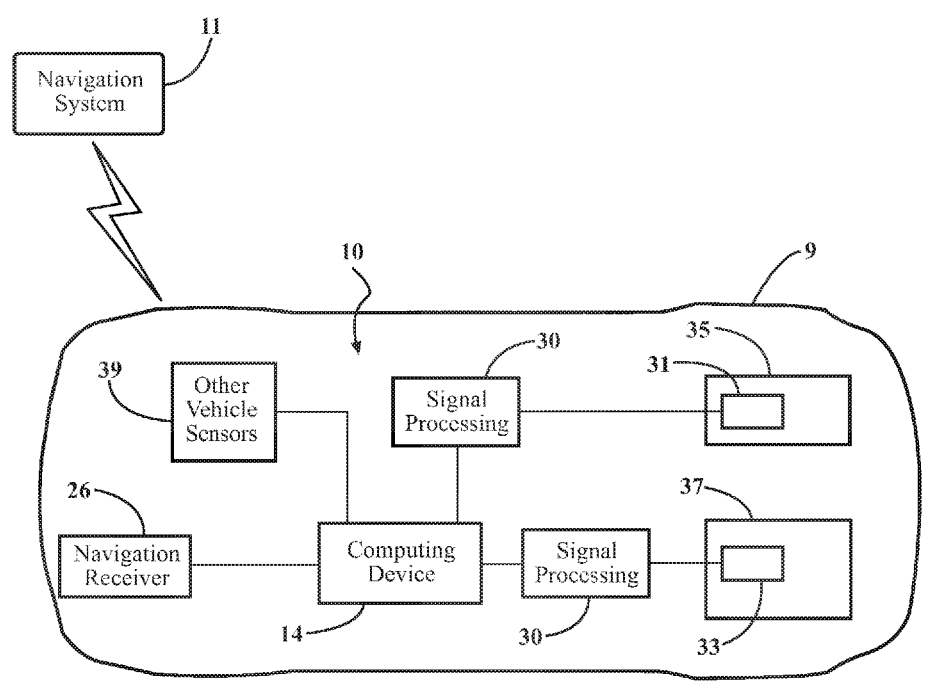
FIG. 1 is a block diagram of one embodiment of a fluid replacement monitoring system 10.

FIG. 1 shows a block diagram of one embodiment of a fluid replacement monitoring system 10 incorporated into a vehicle 9. In the embodiment shown, system 10 includes a fluid replacement monitoring system computing device 14 and one or more fluid sensors 31, 33 in operative communication with computing device 14 and configured for detecting the presence and/or levels of vehicle fluids located in one or more associated fluid reservoirs 35 and 37.

Figure 2:
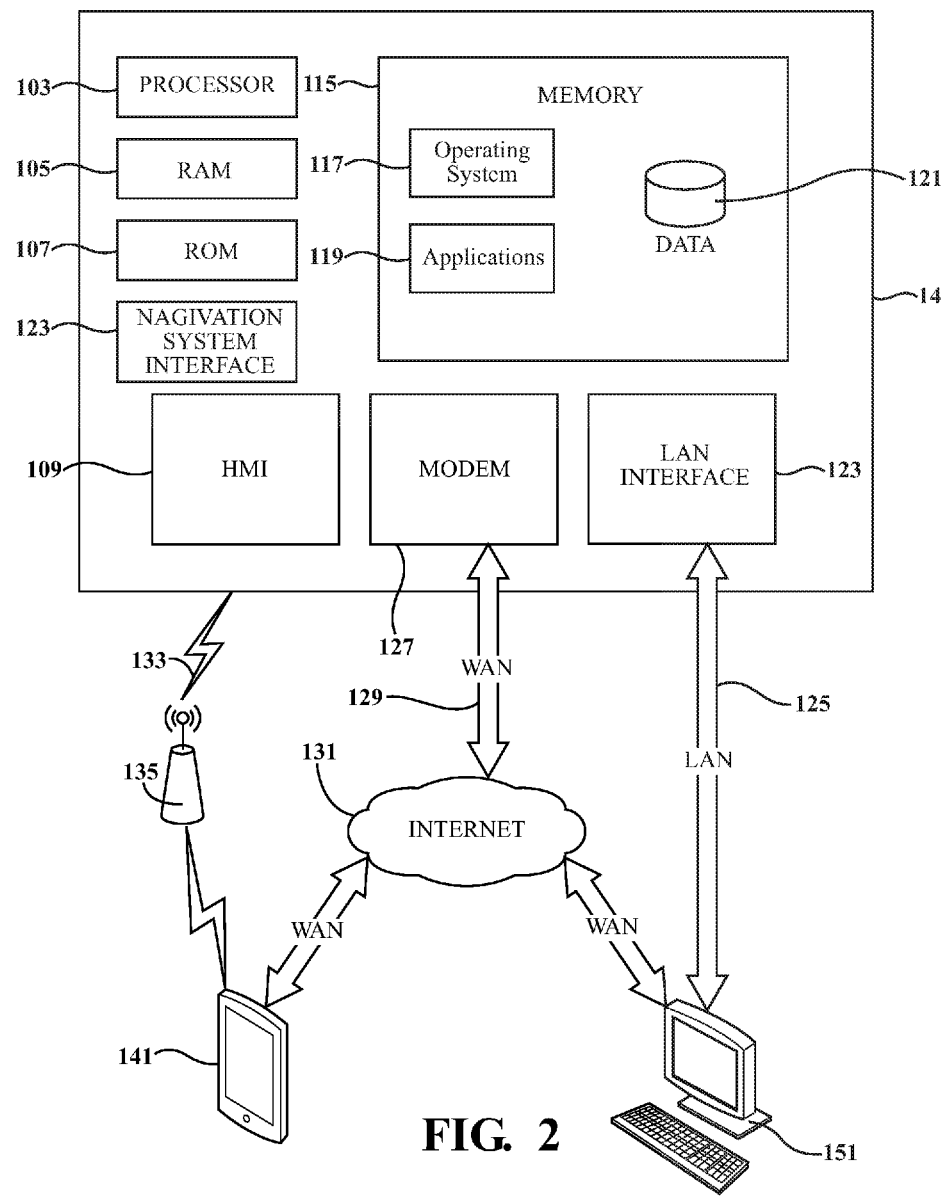
FIG. 2 is a block diagram of a computing device in a fluid replacement monitoring system according to one or more illustrative embodiments of the disclosure.

FIG. 2 illustrates a block diagram of a computing device 14 in a fluid replacement tracking system according to one or more illustrative embodiments of the disclosure. The computing device 14 may have one or more processors 103 for controlling overall operation of the device 14 and its associated components, including RAM 105, ROM 107, input/output module or HMI (human machine interface) 109, memory 115 and any additional elements, such as navigation system interface 123, and any other associated elements.

Input/Output (I/O) 109 may include a microphone, keypad, touch screen, and/or stylus through which a user of the computing device 14 may provide input, and may also include one or more of a speaker for providing audio output and a video display device for providing textual, audiovisual and/or graphical output. Software may be stored within memory 115 and/or other suitable storage to provide instructions to processor 103 for enabling device 14 to perform various functions. For example, memory 115 may store software used by the device 14, such as an operating system 117, application programs 119, and an associated internal database 121. Processor 103 and its associated components may enable the fluid replacement monitoring system 10 to execute a series of computer-readable and executable instructions directed to performing the various functions and operations described herein. Computing device 14 is also configured (for example, using a suitable navigational interface 123) for operative communication with a navigation system 11 (for example, through a navigation system receiver 26 such as a conventional GPS device) for the purposes described herein. Computing device 14 is configured to receive current or updated vehicle location information (such as GPS coordinates) from the navigation system. For purposes of description herein, the location of the vehicle will be discussed in terms of GPS coordinates provided by a GPS system. However, it will be understood that vehicle location information and other navigation information used for the purposes described herein may be in any suitable alternative form.

The fluid replacement monitoring system computing device 14 may operate in a networked environment supporting connections to one or more remote computers, such as terminals/devices 141 and 151. Fluid replacement monitoring system computing device 14, and related terminals/devices 141 and 151, may include devices installed in vehicles, mobile devices that may travel within vehicles, or devices outside of vehicles. Thus, the fluid replacement monitoring system computing device 14 and terminals/devices 141 and 151 may each be embodied in personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the fluid replacement monitoring system computing device 14. The network connections depicted in FIG. 2 may include a local area network (LAN) 125 and a wide area network (WAN) 129, and a wireless telecommunications network 133, but may also include other networks. When used in a LAN networking environment, the fluid replacement monitoring system computing device 14 may be connected to the LAN 125 through a network interface or adapter 123. When used in a WAN networking environment, the device 14 may include a modem 127 or other means for establishing communications over the WAN 129, such as network 131 (e.g., the Internet). When used in a wireless telecommunications network 133, the device 14 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and hazard avoidance system components described herein may be configured to communicate using any of these network protocols or technologies.

The various communications modes described above enable communication with the computing device 14 for purposes of accessing the fluid replacement monitoring information stored in the computing device memory. The communications may be wireless for remote access to the information, or the fluid replacement monitoring information may be accessed using a wired connection established between computing device 14 and, for example, a vehicle diagnostic system at a service facility using a terminal such as terminal 151 previously described.

Computing device 14 is also configured for monitoring the draining and replacement of various vehicle fluids from associated components or systems. For this purpose, computing device 14 is configured for receiving from each of sensors 31 and 33 an indication of a "fluid-empty" condition in an associated fluid reservoir. Computing device 14 is also configured for receiving from each of sensors 31 and 33 an indication of a "fluid-present" condition occurring after the "fluid-empty" condition in the associated fluid reservoir.

As used herein, the term "fluid reservoir" refers to any enclosure designed to hold a fluid used by the vehicle during operation of the vehicle. For example, the fluid may be drawn from the pertinent reservoir for circulation through a portion of the vehicle (not shown), then returned to the reservoir for future use in a manner known in the art. Alternatively, the fluid may be used at the location in which it is stored. Examples of the fluids which may be monitored include engine oil, brake fluid, transmission fluid, engine coolant, and transfer fluid.

Computing device 14 is also configured for acquire, after receiving the indication of a "fluid-present" condition in a reservoir, information relating to the "fluid-present" condition. This information may include (but is not limited to) information indicative of a type of fluid (e.g., transmission fluid, engine oil, etc.) being changed; information indicative of a location of the vehicle when the indication of the "fluid-present" condition was received; information indicative of a total mileage traveled by the vehicle as of the time the indication of the "fluid-present" condition was received; information indicative of a calendar date when the indication of the "fluid-present" condition was received; and information indicative of a time of day when the indication of the "fluid-present" condition was received. If desired, information relating to other pertinent parameters may also be recorded.

Computing device 14 is also configured for time-correlating and associating all incoming information relating to any particular "fluid-present" condition for a given fluid reservoir. This connects the gathered information into a record describing various aspects of each individual fluid change performed in the vehicle. Computing device 14 is also configured for maintaining, in a memory, the information acquired after each detected "fluid-present" condition.

Computing device 14 is also configured for maintaining, in a memory and for each fluid reservoir for which an indication of a "fluid-present" condition is received, a running total of a number of "fluid-present" condition occurrences detected in an associated fluid reservoir. This running total is deemed to be indicative of the number of fluid changes executed for fluid in the associated reservoir. The computing device may also incorporate security protocols designed to prevent tampering with (or unauthorized access of) the fluid replacement monitoring information stored in memory.

Navigation system receiver 26 (for example, a GPS receiver or device) is in operative communication with computing device 14 and provides vehicle location information to the computing device. GPS device 26 may be a known GPS device configured for communication with navigation system 11 (for example, a GPS satellite system). Device 26 may be embodied in a known GPS receiver separate from computing device 22 and configured for wired or wireless communication with computing device 14. In a manner known in the art, device 26 receives current coordinates of the vehicle. The vehicle positional coordinates may be in the formed of GPS coordinates or may alternatively include absolute locational information expressed in terms of any other suitable coordinate system, and/or in terms of a relative location with respect to another vehicle or a fixed point. Device 26 may also provide calendar date and time information to the computing device 14. In an alternative embodiment, the navigation system interface or GPS device is incorporated into the computing device 14 and is configured for operative communication with the other elements of the computing device.

Referring again to FIG. 1, fluid sensors 31, 33 are configured for detecting the presence and/or levels of vehicle fluids located in one or more associated fluid reservoirs 35 and 37. Sensors 31 and 33 are configured for operative communication with computing device 14, to provide the computing device with notification of "fluid-empty" and "fluid-present" conditions in the reservoirs as soon as possible after either of these conditions occurs. Sensors 31 and 33 may be operatively coupled to and powered by the vehicle battery (not shown) or by one or more associated alternative suitable power sources, so that the sensors may perform their functions when the vehicle engine is shut off.

Sensors 31, 33 may include, for example, sensor(s) configured to detect the presence and/or levels of engine oil, brake fluid, transmission fluid, engine coolant, transfer fluid, and any other fluids used for operation of the vehicle. FIG. 1 shows two representative sensors 31 and 33 positioned in (or in operative communication with) associated fluid reservoirs 35 and 37. Reservoirs 35 and 37 may contain, for example, engine coolant and engine oil. Although only two sensors 31 and 33 are shown for purposes of illustration, it is understood that the computing device 14 can be in operative communication with any desired number of sensors providing information relating to any number of associated fluid reservoirs.

Sensors 31 and 33 may be any type (or types) of fluid sensors, provided that they are configurable for operative communication with computing device 14 and are operable to perform the functions described herein. Sensors 31 and 33 may be suitable fluid level sensors, for example, and may be electronic, electro-mechanical (for example, float-type sensors), or otherwise. Other sensors may also be operatively coupled to the computing device 14 for providing additional information to the computing device as needed. For example, the computing device 14 may receive vehicle mileage information from the vehicle odometer or other suitable mileage sensor. Navigation system receiver 26 may provide calendar date and time information to the computing device 14. Alternatively, the date and time information may be received from another source or may be provided by a computing device internal clock.

In embodiments described herein, each of sensors 31 and 33 is configured for detecting a "fluid-empty" condition" and a "fluid-present" condition in respective fluid reservoirs 35 and 37. As used herein, a "fluid-empty" condition refers to a condition where all or almost all of the fluid has been drained from an associated reservoir. The computing device 14 may be configured to interpret this condition as being part of a fluid replacement procedure. Also as used herein, a "fluid-present" condition, when detected following a "fluid-empty" condition, refers to a condition where sufficient replacement fluid has been added to the reservoir to enable subsequent operation of the vehicle. Various additional vehicle sensors (collectively designated 39) may be configured to provide the computing device 14 with vehicle mileage information and any other information pertinent to the fluid replacement monitoring system functions and capabilities described herein.

Fluid level sensors may be configured to provide an ongoing or constantly updated indication of the fluid levels in a reservoir. Depending on the type of sensor employed, the sensor may send a signal to the computing device indicating that the fluid level in the reservoir is considered to be "empty" or "present". Alternatively, the sensor may send a signal to the computing device communicating a fluid level value that is low enough to fall within a range that the computing device is programmed to consider "empty", or high enough to fall within a range that the computing device is programmed to recognize as a "fluid-present" condition. For the purposes described herein, any signal received by the computing device that either directly indicates a "fluid-empty" or "fluid-present" condition or that may be interpreted by the computing device as indicative of a "fluid-empty" or "fluid-present" condition, is considered to be an indication of a "fluid-empty" condition or a "fluid-present" condition in the associated fluid reservoir.

Signals from sensors 31 and 33 to computing device 14 may require processing (for example analog-to-digital (A/D) or digital-to-analog (D/A) conversion) prior to interpretation and/or further processing by computing device 14. For such cases, suitable signal processing means 30 may be included in system 10 (for example, located along a signal path between the computing device 14 and the sensors). Signal processing means 30 may be separate from computing device 14 or incorporated into the computing device 14.

Figure 3:
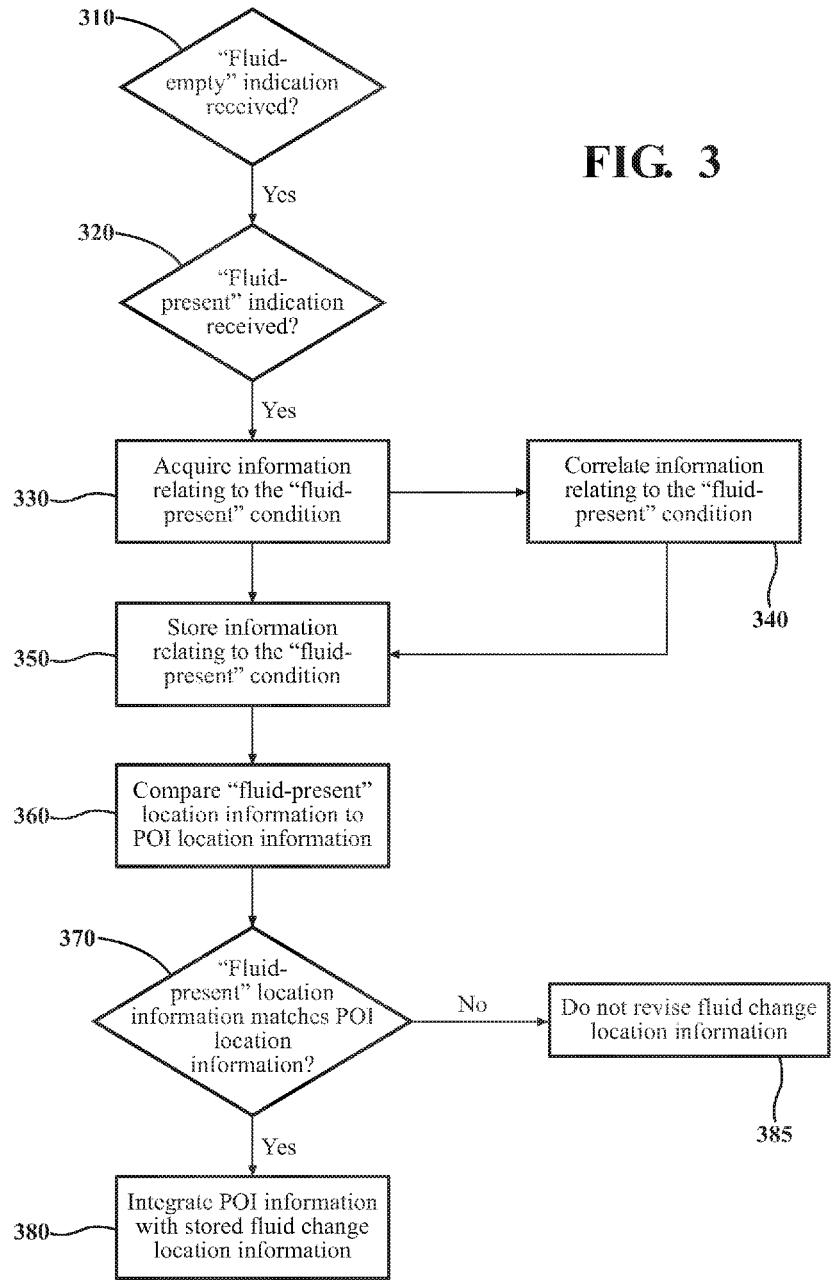
FIG. 3 is a flow diagram illustrating operation of one embodiment of a replacement monitoring system as described herein.

FIG. 3 is a block diagram illustrating operation of one embodiment of the fluid replacement monitoring system described herein, for a fluid change in an associated reservoir. The steps described below may be executed for a single fluid change or for each fluid change of multiple fluid changes occurring simultaneously.

In block 310, at some point after draining of the fluid in a reservoir commences, an associated fluid sensor will provide an indication of a "fluid-empty" condition in the reservoir. In a particular embodiment, the system is configured to interpret a "fluid-empty" condition detected when the vehicle is at rest as part of a fluid-change procedure. This aids in preventing false-positive fluid change indications due to, for example, a leak in the reservoir during vehicle operation.

At some point after detection of the "fluid-empty" condition, replacement fluid is added to the reservoir. In block 320, when the replacement fluid has reached a sufficient level, the fluid sensor will provide an indication of a "fluid-present" condition in the reservoir. The sensor or computing device 14 may be configured to determine that the "fluid-present" condition has occurred when sufficient fluid is added to the reservoir to enable normal operation of the vehicle, or when sufficient fluid is added to the reservoir to reach a recommended fluid level. Alternative fill criteria may also be used for this determination.

In block 330, responsive to receipt of the "fluid-present" condition by the computing device 14, information relating to the "fluid-present" condition is acquired as previously described. For example, the sensor location or other information is indicative of the type of fluid being changed. The location of the fluid change may be determined from GPS coordinate or other location information received by computing device 14 from navigation information receiver 26. Vehicle mileage may be obtained from the vehicle odometer. Date, time and year information may be obtained from the navigation system, from an internal clock, or from other sources.

If desired, in block 340, after acquiring the information relating to the "fluid-present" condition, the information may be correlated (for example, time-correlated) or associated so that it may be referenced or stored in memory as a single file containing the pertinent information relating to a particular fluid change.

All of the acquired information relating to a given fluid change may be automatically correlated and/or associated by the computing device, so as to provide a storable and retrievable record of the pertinent information relating to the fluid change. For example, a date- or time-indication flag or other identifier may be applied to each piece of information acquired so that each piece of information pertaining to a particular fluid change is correlated with all of the other pieces pertaining to that fluid change.

In block 350, the information relating to the "fluid-present" condition is stored in memory. Alternatively, the information relating to the "fluid-present" condition may be stored in memory after acquisition, without correlating the information prior to storage.

In the manner described above, the fluid replacement monitoring system effects an automatic recordation of the fluid change and the values of pertinent parameters relating to the fluid change. The system also maintains a running total of all fluid changes performed each fluid reservoir. This provides an accurate and secure record of all vehicle fluid changes, which aids in determining if recommended maintenance has been performed on the vehicle.

As discussed previously, the stored fluid change information may be accessed using a wired connection at a dealer location. Alternatively, the information may be accessed via wireless communication by an authorized user (for example, a dealer representative).

Referring to block 360, in a particular embodiment, the computing device 14 is configured to automatically compare the location information and (optionally) other information relating to a detected "fluid-present" condition with coordinates or other location information relating to POI's (points of interest) stored in the computing device memory, on the navigation information receiving device 26, in the navigation system or at another location. The POI's may consist of locations of various locations where fluid changes may be performed, such as the vehicle owner's home, an approved vehicle service facility, or a third party service facility.

In block 370, it is determined if the location information relating to the fluid change matches the location information relating to a known POI. In block 380, if there is a match, the POI information may be automatically integrated into the stored fluid change location information in memory. This information may then be accessed from memory along with the other fluid change information as previously described. Alternatively, if additional information (for example, a business name, phone number, etc.) relating to the stored location of the fluid change is stored on GPS maps or in a navigational database, this additional information may be automatically integrated into the stored fluid change location information in memory and accessed from memory along with the other fluid change information as previously described. If the fluid change location does not match any POI information, the fluid change location as currently stored may be left unaltered in memory (block 385).

In an alternative embodiment, the location information and other information relating to a detected "fluid-present" condition is compared with the POI location information upon request. Also, integration of any available additional information with the previously acquired fluid change information may be done upon request.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing device for a fluid replacement monitoring system in a vehicle, the computing device comprising one or more processors residing on the vehicle for controlling operation of the computing device, and a memory residing on the vehicle for storing data and program instructions usable by the one or more processors, wherein the one or more processors are configured to execute instructions stored in the memory to:
   receive an indication of a "fluid-empty" condition in a fluid reservoir of the vehicle;
   receive an indication of a "fluid-present" condition occurring in the fluid reservoir of the vehicle after the indication of the "fluid-empty" condition in the fluid reservoir was received;
   acquire, responsive to receiving the indication of the "fluid-present" condition, information indicative of a location of the vehicle when the indication of the "fluid-present" condition in the fluid reservoir of the vehicle was received; and
   store, in the memory residing on the vehicle, the information indicative of a location of the vehicle when the indication of the "fluid-present" condition was received.

2. The computing device of claim 1 wherein the one or more processors are configured to execute instructions stored in the memory to correlate the information relating to the "fluid-present" condition.

3. The computing device of claim 1 wherein the one or more processors are configured to execute instructions stored in the memory to:
   compare the information indicative of the location of the vehicle when the indication of the "fluid-present" condition was received with coordinates or other location information relating to points of interest; and
   determine if the information indicative of the location of the vehicle when the indication of the "fluid-present" condition was received matches information relating to the points of interest.

4. The system of claim 3 wherein the location information relating to points of interest is stored in the memory residing on the vehicle and include any of a vehicle owner's home, an approved vehicle service facility, and a third party service facility.

5. The computing device of claim 3 wherein, the one or more processors are configured to execute instructions stored in the memory to, if there is a match between the information indicative of the location of the vehicle when the indication of the "fluid-present" condition was received and location information relating to the points of interest, integrate location information relating to the points of interest with the information indicative of the location of the vehicle when the indication of the "fluid-present" condition was received, by adding to the memory the information indicative of the location of the vehicle when the indication of the "fluid-present" condition was received.

6. The computing device of claim 5 wherein the one or more processors are configured to execute instructions stored in the memory to, if additional information relating to the location of the vehicle when the indication of the "fluid-present" condition was received is available, integrate the additional information with the information indicative of the location of the vehicle when the indication of the "fluid-present" condition was received, by adding the additional information to the memory.

7. The computing device of claim 1 wherein the one or more processors are configured to execute instructions stored in the memory to acquire, responsive to receiving the indication of the "fluid-present" condition, information indicative of a calendar date when the indication of the "fluid-present" condition was received.

8. The computing device of claim 1 wherein the one or more processors are configured to execute instructions stored in the memory to acquire, responsive to receiving the indication of the "fluid-present" condition, information indicative of a time of day when the indication of the "fluid-present" condition was received.

9. The computing device of claim 1 wherein the one or more processors are configured to execute instructions stored in the memory to maintain, in a memory and for each type of fluid for which an indication of a "fluid-present" condition is received, a running total of a number of "fluid-present" condition occurrences detected in an associated fluid reservoir.

10. A method of monitoring vehicle fluid changes in a vehicle, comprising steps of:
   mounting, on the vehicle, a computing device configured to acquire and store information relating to fluid changes in the vehicle;
   detecting, in a fluid reservoir of the vehicle, an occurrence of a "fluid-empty" condition;
   detecting, in the fluid reservoir of the vehicle, a "fluid-present" condition occurring after the occurrence of the "fluid-empty" condition;
   acquiring, by the computing device after detection of the "fluid-present" condition, information relating to a location of the vehicle when the "fluid-present" condition was detected; and
   storing, in a memory of the computing device, the information relating to the location of the vehicle when the "fluid-present" condition was detected.

11. The method of claim 10 further comprising the step of, prior to the step of storing the information relating to the detected "fluid-present" condition, correlating the information relating to the detected "fluid-present" condition.

12. The method of claim 10 further comprising the steps of:
   comparing information relating to the location of the vehicle when the "fluid-present" condition was detected with location information relating to points of interest; and
   if the information relating to the location of the vehicle when the "fluid-present" condition was detected matches the location information relating to any of the points of interest, integrating the matching point of interest location information with the information relating to the location of the vehicle when the "fluid-present" condition was detected by adding to the memory the information relating to the location of the vehicle when the "fluid-present" condition was detected.

13. The method of claim 12 further comprising the step of, if additional information relating to the location of the vehicle when the "fluid-present" condition was detected is available, integrating the additional information with the information relating to the location of the vehicle when the "fluid-present" condition was detected by adding to the memory the additional information.

14. The method of claim 12 wherein the points of interest include any of a vehicle owner's home, an approved vehicle service facility, and a third party service facility.

* * * * *